US008672342B2

(12) United States Patent
McCarthy (10) Patent No.: US 8,672,342 B2
(45) Date of Patent: Mar. 18, 2014

(54) FOLDABLE CART FOR GOLF BAG

(76) Inventor: Therese M. McCarthy, Kings Park, NY (US)

( * ) Notice: Subject to any disclaimer, the term of this patent is extended or adjusted under 35 U.S.C. 154(b) by 0 days.

(21) Appl. No.: 13/558,415

(22) Filed: Jul. 26, 2012

(65) Prior Publication Data

US 2014/0028004 A1     Jan. 30, 2014

(51) Int. Cl.
    *B62B 1/04*      (2006.01)
    *B62B 3/00*      (2006.01)

(52) U.S. Cl.
    CPC ............. *B62B 3/00* (2013.01); *B62B 2202/404* (2013.01); *Y10S 280/06* (2013.01)
    USPC ..................... 280/651; 280/47.34; 280/DIG. 6

(58) Field of Classification Search
    USPC ............ 280/38, 42, 639, 648, 655.1, 47.341, 280/47.371, 47.16, 47.17, 47.18, 47.2, 280/47.26, 47.315, DIG. 6; 248/96; 224/274
    See application file for complete search history.

(56) References Cited

U.S. PATENT DOCUMENTS

| | | | |
|---|---|---|---|
| 2,803,469 A * | 8/1957 | Pfisterer | ........................... 280/38 |
| 4,629,202 A | 12/1986 | Nelson et al. | |
| 4,735,425 A | 4/1988 | Hoff | |
| 4,822,070 A * | 4/1989 | Korona et al. | ............... 280/47.2 |
| 4,848,504 A * | 7/1989 | Olson | .......................... 180/19.1 |
| 5,232,065 A * | 8/1993 | Cotton | ............... 180/11 |
| 5,967,543 A | 10/1999 | Taylor | |
| 6,000,712 A * | 12/1999 | Wu | ............................... 280/639 |
| 6,050,592 A | 4/2000 | Kim | |
| 6,283,238 B1 * | 9/2001 | Royer et al. | ................. 180/19.1 |
| 6,446,987 B2 * | 9/2002 | Abraham et al. | ............ 280/47.2 |
| 6,979,019 B2 | 12/2005 | Chen | |
| 6,988,738 B2 | 1/2006 | Lu | |
| 7,063,340 B1 | 6/2006 | Wu | |
| 7,128,333 B2 | 10/2006 | Reimers et al. | |
| 7,303,197 B1 | 12/2007 | Searle | |
| D596,365 S | 7/2009 | Reimers et al. | |
| D596,821 S | 7/2009 | Reimers et al. | |
| 7,862,053 B2 | 1/2011 | Liao | |
| 8,408,562 B1 * | 4/2013 | Tse et al. | ......................... 280/38 |
| 2005/0040616 A1 * | 2/2005 | Cheng | ......................... 280/47.24 |
| 2013/0087994 A1 * | 4/2013 | Pratt | ............................. 280/651 |

* cited by examiner

*Primary Examiner* — John Walters
*Assistant Examiner* — Brian Swenson
(74) *Attorney, Agent, or Firm* — Sorell, Lenna & Schmidt, LLP (57) ABSTRACT

A removable cart for a golf bag is provided. The cart includes a frame for receiving and releasably retaining a golf bag, a first set of wheels and a second set of wheels operatively connected to the cart frame, the first set of wheels configured to extend to a distance longer than the second set of wheels. Upon folding, the first set of wheels wraps around to encompass the second set of wheels. The first and the second set of wheels are connected by axles such that each set of wheels remains parallel to each other at all times, in both a folded position and an open position.

20 Claims, 12 Drawing Sheets

FOLDABLE CART FOR GOLF BAG

TECHNICAL FIELD

The present disclosure generally relates to accessories for golfers and particularly to methods for transporting golf bags used by golfers.

BACKGROUND

Many golfers take the sport of golf seriously. Most golfers may have a large selection of clubs to use for every foreseeable occasion, and consequently, the golf bag and its collection of clubs may become heavy and cumbersome to carry around the golf course. One answer to this problem has been the golf cart, to which the bag can be strapped, thus relieving the golfer of the burden of carrying his collection of clubs upon his shoulders.

Although some golfers prefer to carry the golf bag, either personally or through the use of a caddy, many other golfers prefer to use carts to transport the golf bags and associated equipment. While riding carts are required by many courses, a great number of players desire to gain the exercise benefits of walking during the round, without carrying the bag and equipment. For this reason walking carts are popular.

A golf cart ideally has several qualities which make it well suited for its purpose. One such quality is stability, since the cart will be expected to be driven over rough terrain, possibly in varying weather conditions. To aid in stability, it is thus desirable that the cart have tires and wheels of a sufficient diameter that the wheels do not become stuck in small ruts and mud puddles. The cart should have a sufficiently wide wheelbase that it does not easily tip over when on sloped terrain, or when buffeted by winds. It must additionally be large enough in its frame that a fair sized golf bag can be easily secured to it, usually at top and bottom, thus implying a certain minimum length between the wheels and the upper handle. Another desirable quality is the ability of a golf cart to be easily folded and placed in the trunk of a car for transportation and storage. Similarly, yet another desirable characteristic is the ability to open a folded golf cart easily once it is removed from the trunk of a car.

There is thus still a great need for a golf cart which can collapse or fold so that its various components can be reconfigured into a very compact structure, but without disassembling its components, and thus can be quickly moved from a collapsed configuration to an extended one with a minimum of effort. The present disclosure describes an improvement over these prior art technologies.

SUMMARY

Accordingly, a removable cart for a golf bag is provided. The cart includes a frame for receiving and releasably retaining a golf bag, a first set of wheels and a second set of wheels operatively connected to the cart frame, the first set of wheels configured to extend to a distance longer than the second set of wheels. Upon folding, the first set of wheels wraps around to encompass the second set of wheels. The first and the second set of wheels are connected by axles such that each set of wheels remains parallel to each other at all times, in both a folded position and an open position.

In various embodiments, the cart frame includes a hollow shaft connecting a top golf bag support mount to a bottom golf bag support. The cart frame also includes a linkage set configured for linking the first set of wheels and the second set of wheels to the hollow shaft.

The linkage set further comprises a top linkage, a bottom linkage and a plate hingedly connecting the top and bottom linkages.

The golf cart further includes a handle assembly that has a foldable handle that may be telescopic, foldable without being telescopic or foldable with telescopic features. The handle and a handle support system are attached to the cart frame and allow the handle to move from a folded position into an unfolded position effortlessly. Often this can be done with one hand. The handle support system comprises a moveable construction that can lock the handle in folded and unfolded positions. In one embodiment the handle support system has a core intermediate to a first and a second plate, both plates secured by a fastening assembly, such as a nut and bolt assembly, the core further comprising a first bore configured to receive a locking pin of the locking assembly so that the is locked in a folded position parallel to the hollow shaft.

The handle support system further comprises a second bore configured to receive a locking ring pin of the locking assembly so as to lock the handle in the unfolded position. In various embodiments, there can be different positions that the handle can be locked in between folded and unfolded so as to give the user a choice of positions so as to arrive at the position that is most comfortable to the user. In other embodiments, when the locking ring pin is removed from the first bore, the handle can be removed completely from the cart and replaced with a different handle or not used at all.

The handle support system also comprises a band grip attached through snaps to the nut and bold assembly of the handle support system. The band grip can be used to pull the golf cart when the handle is removed for storage.

The cart can also have a top golf bag support mount configured for securing the upper portion of the golf bag. In some aspects, the top golf bag-retaining element includes a pair of straps secured to the top golf bag support mount by snaps.

The cart can also have a bottom golf bag support mount configured for securing the bottom portion of the golf bag to the cart. The bottom bag-retaining element may include a pair of straps secured to the bottom golf bag support element by snaps, an adjustable clamp configured like a ski boot clamp.

The present disclosure also contemplates a combination golf bag and golf cart, which includes an elongate golf bag for receiving a plurality of golf clubs, the bag having a top portion and a bottom portion and a removable golf cart comprising a cart frame for receiving and releasably retaining a golf bag and a first set of wheels and a second set of wheels operatively connected to the cart frame. The first set of wheels can be configured to extend to a distance longer than the second set of wheels. Upon folding, the first set of wheels wraps around to encompass the second set of wheels. The first set of wheels and the second set of wheels are each connected by axles such that each set of wheels remain parallel to each other at all times, in both a folded position and an open position.

The cart frame also includes a hollow shaft which can connect the top golf bag support mount to the bottom golf bag support and the linkage set configured for linking the first set of wheels and the second set of wheels to the hollow shaft. The linkage set includes a top four-bar linkage and a bottom four-bar linkage as well as plate and a T-shaped bar.

The removable cart further comprises a handle assembly, which includes a removable handle and a handle support system for controlling the motion of the cart frame from a folded position into an open position with one hand. The handle support system comprises a core intermediate, a first and a second plate, both plates secured by a nut and bolt assembly, the core further comprising a first bore configured to receive the handle such that in a folded position the handle is parallel to the hollow shaft.

The handle support system further defines a second bore positioned to perforate the handle support system from the first plate through the core to the second plate. The second bore configured to receive a locking ring pin adapted to control the movement of the handle. The handle can be removable. At one end, the telescopic handle can be threadingly inserted into the core of the handle support system. At the opposite end, the telescopic handle is operatively connected to a set of poles, which in turn are operatively connected to a handgrip.

This disclosure also provides a method for attaching and removing a golf bag from the golf cart for storage. This can be accomplished by opening the top and bottom straps so as to release the golf bag so that the golf cart of this disclosure can be easily removed from the golf bag. Once removed, the golf bag can be easily attached to an electric cart, placed in a vehicle for transport or simply stored separately from the golf cart.

While multiple embodiments are disclosed, still other embodiments of the present disclosure will become apparent to those skilled in the art from the following detailed description, which is to be read in connection with the accompanying drawing(s). As will be apparent, the disclosure is capable of modifications in various obvious aspects, all without departing from the spirit and scope of the present disclosure. Accordingly, the detailed description is to be regarded as illustrative in nature and not restrictive.

BRIEF DESCRIPTION OF THE DRAWINGS

In part, other aspects, features, benefits and advantages of the embodiments will be apparent with regard to the following description, appended claims and accompanying drawing (s) where:

Figure 1:
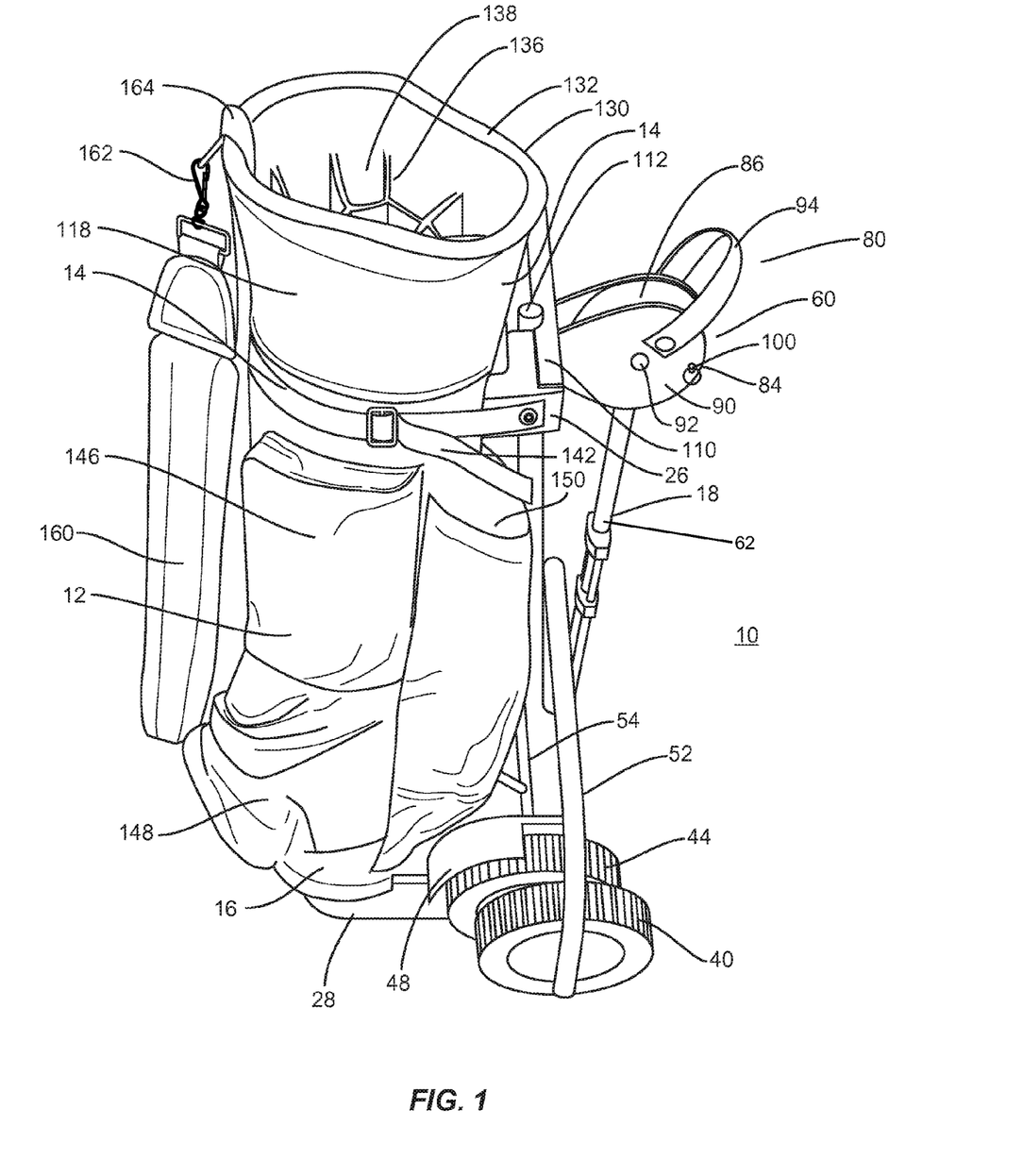
FIG. 1 is a perspective side view of a bag/cart combination with the cart in folded position according to principles of the present disclosure.
Figure 3:
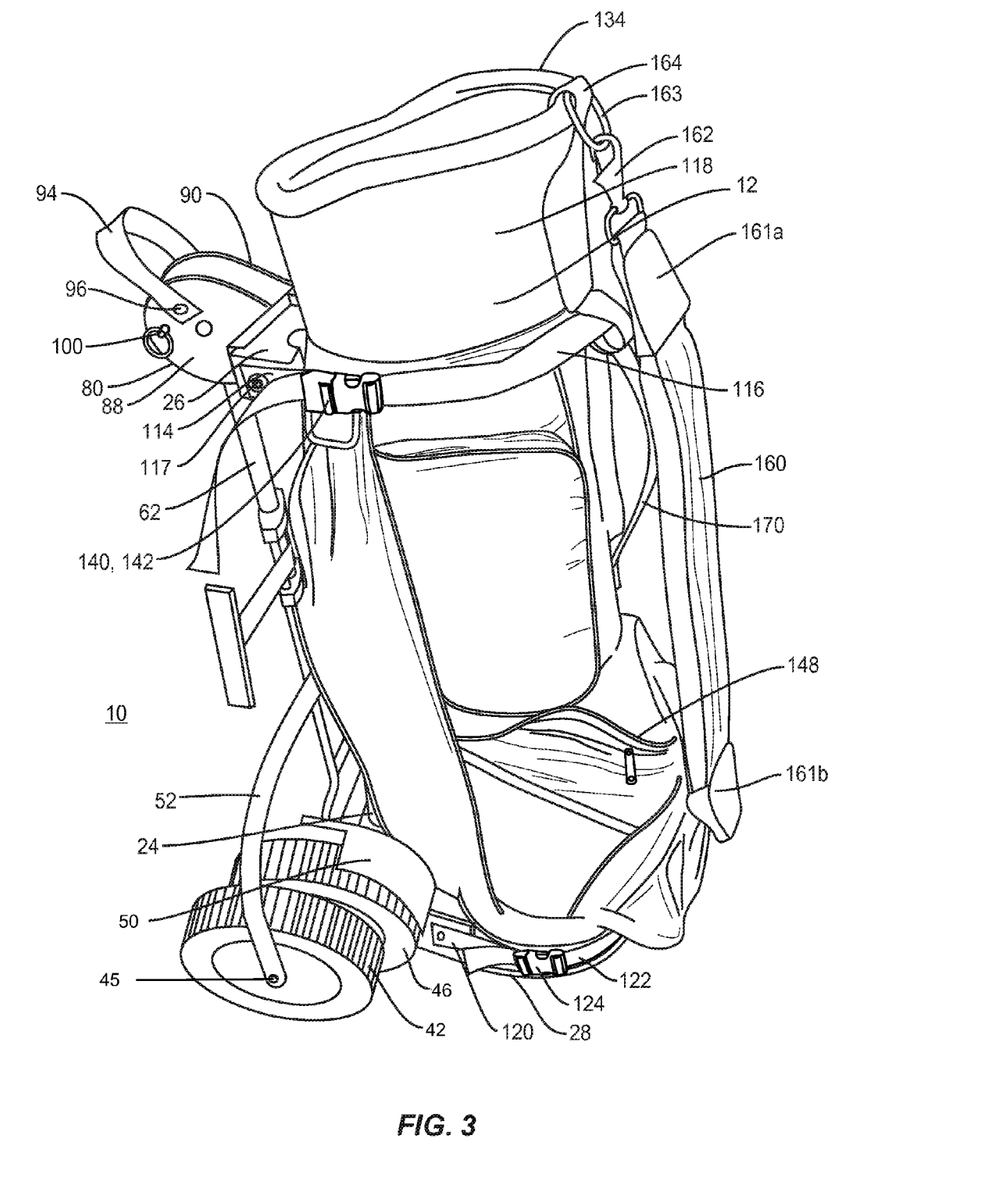
FIG. 3 is a perspective side view of a bag/cart combination with the cart in folded position according to principles of the present disclosure.
Figure 10:
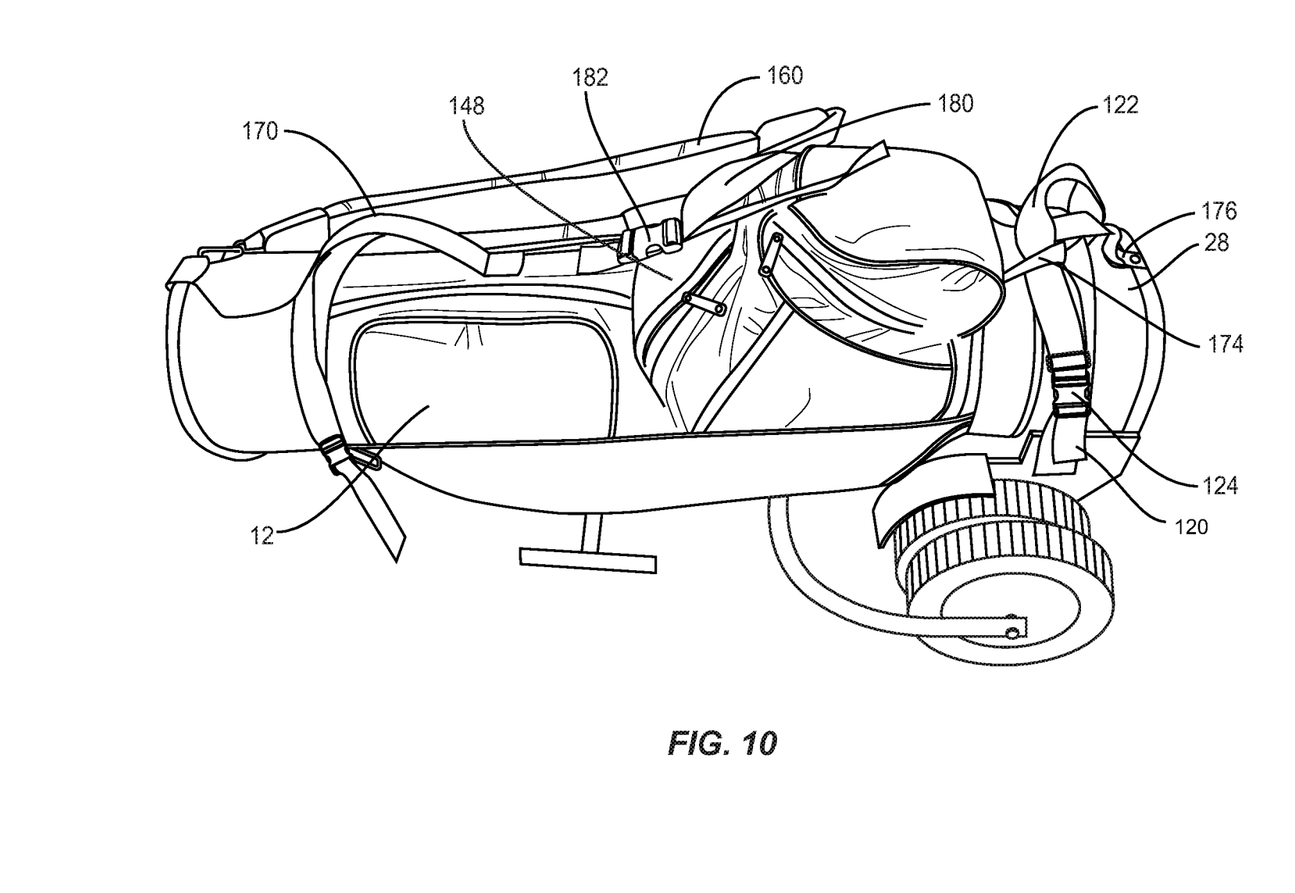
FIG. 10 is a perspective side views of a bag/cart in closed position and lying down according to principles of the present disclosure.

DESCRIPTIVE KEY OF THE FIGURES 10 cart
12 golf bag of 10
14 top portion of 12
16 bottom portion of 12
18 cart frame of 10
20 hollow shaft of 18
22 top end of 20
24 bottom end of 20
26 top golf bag support mount of 12
28 bottom golf bag support element of 12
30 linkage set of 10
32 top linkage of 30
32a, 32b top link and bottom link of 32
32c, 32d, struts of 32
34 bottom linkage of 30
34a, 34b top link and bottom link of 34
34c, 34d, struts of 34
36 plate of 30
36a upper edge of 36
36b lower edge of 36
38 T-shaped handle
40, 42 first set of wheels
43 tire of wheels 40, 42, 44, 46
44, 46 second set of wheels
45 hub of wheels 40, 42, 44, 46
48, 50 brakes of 44, 46 shown in FIGS. 1 and 3
52 axle of 40, 42
54 axle of 44, 46
60 handle assembly
62 removable handle
64 first end of 62
66 second end of 62
68 hand grip connected to 70
69 protective cover of 68
70 set of poles connected to 60
80 handle support system of 60
82 truncated end of 80
84 rounded end of 80
86 core of 80
88 first metal plate of 80
90 second metal plate of 80
87 first bore of handle support system 80
92 nut and bolt assembly holding plates 88, 90
94 grip band
96 snaps attaching grip band 94 to 92
100 locking ring pin
102 second bore of handle support system 80 configured to receive 100
110 hinged bracket of 26
112 bore in 26 and 110
114, 116 top golf bag straps of 26
117 snaps of 114, 116
118 collar of golf bag 12
120, 122 bottom golf bag straps of 28
124 side squeeze buckle of 120
130 housing of bag 12
132 chamber of bag 12
134 circumferential rim of 132

136 divider of 12
138 apertures of 136
140, 142 adjustment members of 114, 116
146 large zippered pocket of 12
148 small, bottom zippered pocket of 12
150 open pocket of 12
160 shoulder strap of 12
161a, 161b leather pieces securing 160
162 snap hook of 160
163 ring of 164
164 flap attached to 134
170 harness handle of 12
174 trunk assistance handle
176 ring attached to bottom support element 28
180 strap attached at lower end of 160
182 side squeeze buckle of 180
230 single bar cart frame of golf cart 200
201 handle assembly of 200
240, 241 first set of wheels of 200
245, 246 second set of wheels of 200
232 hollow crescent spine of 230
231 bottom connector of 232
265 top connector of 232
235 wheel frame of 230
234 pivot axle of 235
216 pivot point 201
215 pivot axel of 216
217 handle bar of 201
211, 212 two-bar system of 215
210 telescopic support system of 201
250 bottom bag support element of 232
220 support strap of 250
260 golf bag of 200
255 side squeeze buckle of 220
270 straight axle of second set of wheels 245, 246

DETAILED DESCRIPTION

The present disclosure is directed to a foldable golf bag cart used to transport golf bags loaded with golf clubs and accessories. The foldable cart is referred to by the general reference number 10 in the drawings and description. The foldable cart 10 may be used with various golf bags and may exist in multiple embodiments.

In one embodiment illustrated in FIG. 1, the foldable golf cart 10 is shown in perspective side view as transporting a typical golf bag 12. Golf bag 12 can have essentially the same design, shape and size as any conventional bag available in the prior art. In some embodiments, golf bag 12 includes an elongate golf bag for receiving a plurality of golf clubs, the bag having a top portion 14 and a bottom portion 16. The top portion 14 of golf bag 12 includes a collar 118 for receiving a plurality of golf clubs.

Cart 10 includes various principle subsystems, which operate together in order to allow the bag/cart combination to be easily opened and set up with only one hand. The subsystems of cart 10 function such that when folded, the wheels and wheel axles do not fold in towards one another. It is this feature, as well as others, that makes golf cart 10 easy to fold and open with one hand as further described in this disclosure. When folded the handle folds down and the four wheels fold side-by-side as shown in FIG. 1. Finally, golf cart 10 is detachable from golf bag 12 so that when an electric cart is available at a club, the wheeled cart 10 can be removed from golf bag 10 and the golf bag used with the electric cart.

Figure 4:
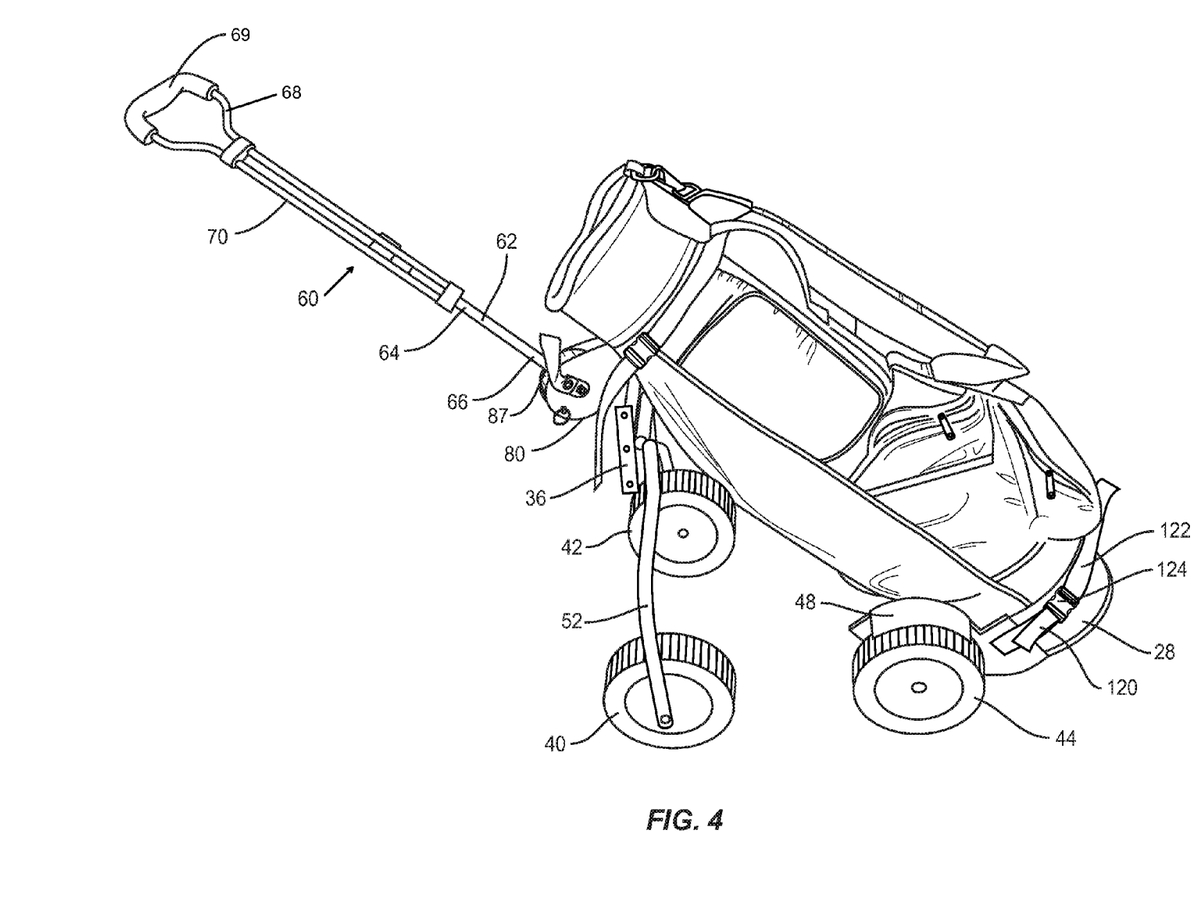
FIG. 4 is a perspective side view of a bag/cart combination with the cart in open position according to principles of the present disclosure.

With reference to FIGS. 1-4, cart 10 includes cart frame 18, a hollow shaft 20, a linkage set 30 (FIG. 2), a first set of wheels 40, 42 (shown in FIG. 2) and a second set of wheels 44, 46 (shown FIG. 2) and a handle assembly 60 (shown in FIG. 4). In some embodiments, as illustrated in FIGS. 1 to 4, the first set of wheels 40, 42 are connected to each other through an inverse U shaped axle 52. Axle 52 is configured to be distanced further apart than the second set of wheels 44, 46 such that upon folding, the first set of wheels 40, 42 can wrap around and envelop the second set of wheels 44, 46. In some embodiments, second set of wheels 44, 46 are connected by a straight axle 54. Both sets of wheels are connected by axles such that each set of wheels remains parallel to each other at all times, in both a folded position and an open position. Second set of wheels 44, 46 also include a pair of wheel brakes 48, 50.

Each wheel 40, 42, 44, 46 comprises a tire 43 and a hub 45 (shown in FIG. 3). As described above, the wheels are connected to rotate freely about the ends of their respective connecting axles, 52 and 54. It is contemplated that alternate embodiments may use various different types of wheels such as, but not limited to, narrow bicycle-type wheels, rugged all-terrain wheels, hard plastic or metal wheels. Referring to FIGS. 1 and 3, in the present embodiment, brakes 48, 50 on second set of wheels 44, 46 enable the second set of wheels to be locked to generally prevent the cart from rolling; however, this brake may be replaced by various different types of stopping means in some alternate embodiments such as, but not limited to, kick stands; other alternate embodiments may be implemented with no stopping means.

Figure 2:
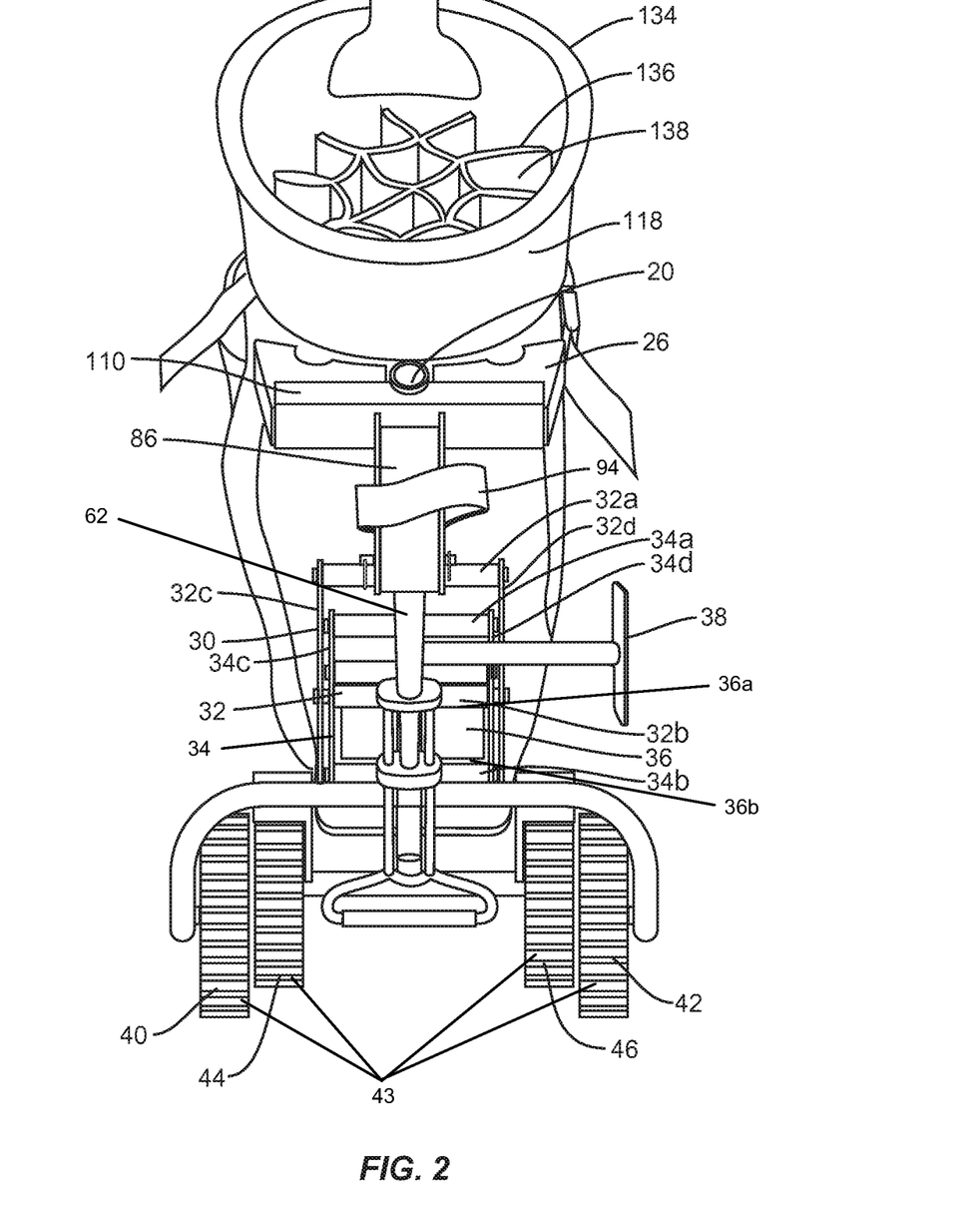
FIG. 2 is a perspective back view of a bag/cart combination with the cart in folded position according to principles of the present disclosure.

As further illustrated in FIGS. 1 to 3, the hollow shaft 20 of cart frame 18 also has two ends, a top end 22 and a bottom end 24 opposite top end 22. Top end 22 of shaft 20 is connected to top golf bag support mount 26 and bottom end 24 of shaft 20 is connected to bottom golf bag support element 28.

Hollow shaft 20 is also connected to linkage set 30, which enables a smooth relative motion between the linkages of linkage set 30 and cart frame 18. As illustrated in FIG. 2, linkage set 30 includes a top four-bar linkage 32 and a bottom four-bar linkage 34, a plate 36 and a T-shaped handle 38. Both top linkage 32 and bottom linkage 34 are parallelogram type linkages connected through plate 36 in order to provide a parallel motion of the first and second set of wheels relative to each other.

Figure 8:
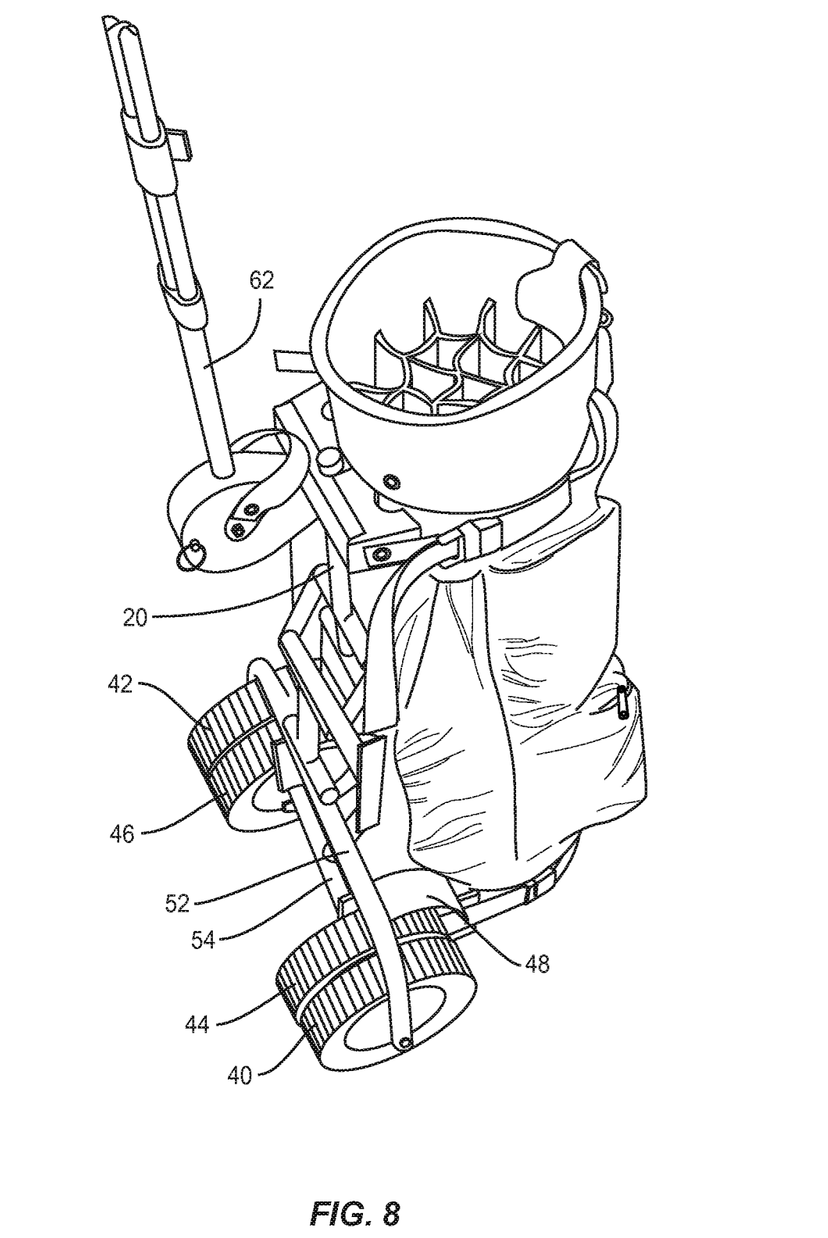
FIG. 8 is a perspective side view of a bag/cart combination in closed position according to principles of the present disclosure.

As further illustrated in FIG. 2, top linkage 32 comprises a top link 32a, a bottom link 32b, pivotally connected to two side struts, 32c and 32d to form a parallelogram structure. Bottom linkage 34 comprises a top link 34a, a bottom link 34b, pivotally connected to two side struts, 34c and 34d to form another parallelogram structure. In the embodiment illustrated in FIG. 2, plate 36 is square in shape and has an upper and lower edge 36a and 36b. The upper edge 36a of plate 36 connects to struts 32c and 32d at a midway location. The lower edge 36b of plate 36 connects to struts 34c and 34d also at a midway location. Bottom link 32b of top linkage 32 is fixedly connected to hollow shaft 20 below T-shaped handle 38 as illustrated in FIG. 2. Bottom link 34b of bottom linkage 34 is also fixedly connected to hollow shaft 20 at a position above the fixed connection of hollow shaft 20 to axle 52 of first set of wheels 40 and 42. In a folded position as illustrated in FIGS. 2 and 8, hollow shaft 20 as well as handle 62 are substantially perpendicular to the ground surface and struts 32c, 32d, 34c and 34d of linkages 32 and 34 are also substantially perpendicular to the ground surface. When cart 10 is in a fully open position, the first set of wheels 40, 42 unrolls from and moves away from the side-to-side position next to second set of wheels 44, 46. In a fully open position as illustrated in FIG. 4, hollow shaft 20 (shown in FIG. 2) assumes a position that is at about 45° from the vertical. In a fully open position, linkages 32 (shown in FIG. 2) and 34 (shown in FIG. 2) swing with a clockwise motion and upper linkage 32 and lower linkage 34 exchange position to provide a smooth parallel motion to the first and second set of wheels.

Figure 6:
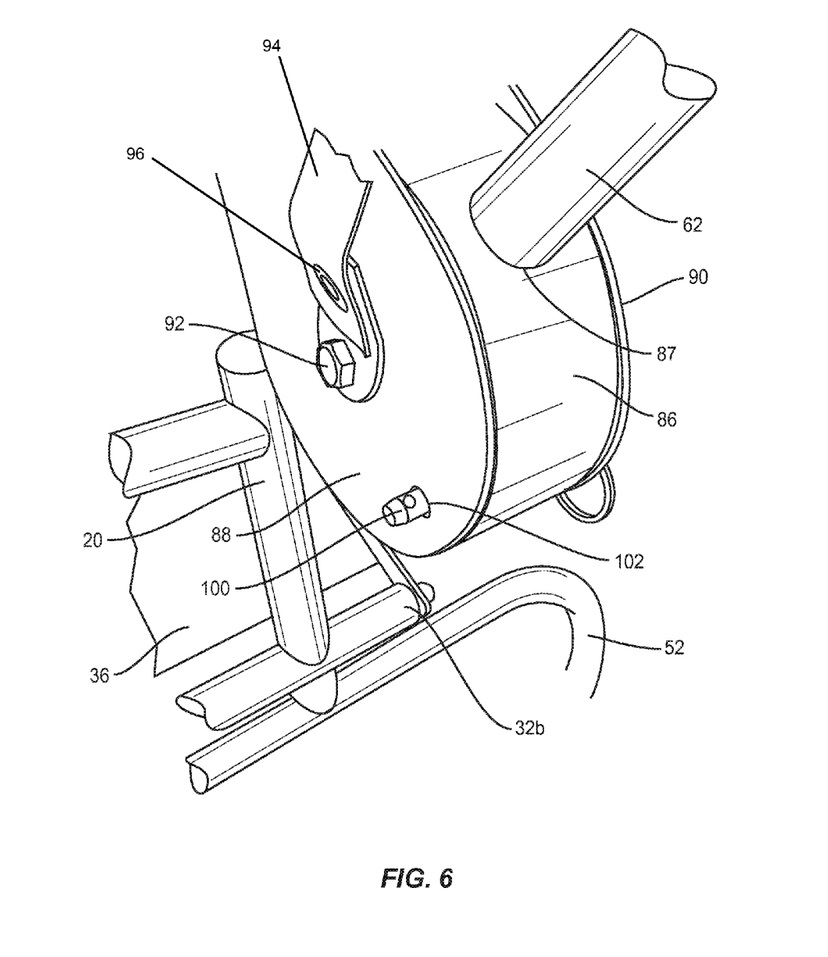
FIG. 6 is a breakaway side view of a component of the cart according to principles of the present disclosure.

Hollow shaft 20 is also fixedly connected to axles 52 and 54 of wheels 40, 42, 44 and 46, respectively. As illustrated in FIG. 6, at a midway position, axle 52 is fixedly connected to hollow shaft 20 at a location below upper linkage 32b. Similarly, at a midway position, axle 54 is fixedly connected to hollow shaft at a location above bottom golf bag support 28 (shown in FIG. 1).

In some embodiments, hollow shaft 20 and linkage set 30 can be fabricated from light aluminum hollow piping or any other material sufficiently strong to carry the full weight of golf bag 12 at a minimum weight.

In certain embodiments, top golf bag support mount 26 connected to hollow shaft 20 holds the top portion of a golf bag. As illustrated in FIGS. 1 to 3, 5, 7 and 8, top golf bag support mount 26 can have a saddle shaped configuration and contain straps 114, 116 for securing the top of golf bag 12. Those skilled in the art, in light of the teachings of this disclosure, will readily recognize that a multiplicity of suitable golf bag support mounts varying in size, shape and type may be used in alternate embodiments for the upper and lower golf bag support elements in order to accommodate a variety of golf bags. Furthermore, some alternate embodiments may use other attachment means such as, but not limited to, straps, clips, cages, bolts, and the like.

With further reference to FIG. 4, in various embodiments, handle assembly 60 includes a removable handle 62 and handle support system 80. Removable handle 62 includes a first end 64 and a second end 66. At first end 64, handle 62 is operatively connected to a set of poles 70 which in turn is operatively connected to hand grip 68.

In the embodiment illustrated in FIG. 4, hand grip 68 is substantially triangular in shape and has a protective cover 69 made of a pliable material such as, but not limited to, rubber to increase the friction between fingers and to make hand grip 68 more comfortable to use. Alternate embodiments may be implemented without this protective cover. Furthermore, it is contemplated that a multiplicity of suitable types of handgrips may be used in alternate embodiments. For example, without limitation, a handgrip comprising a single L-shaped bar may be used in one alternate embodiment. Another alternate embodiment may comprise two single-bar push handles in a V formation. Other exemplary shapes for push handles that are suitable for alternate embodiments include without limitation, T shapes, U shapes, and rectangular shapes. At second end 66, handle 62 is configured to connect threadingly to handle support system 80 through a first bore 87 defined into core 86 as described below.

Figure 5:
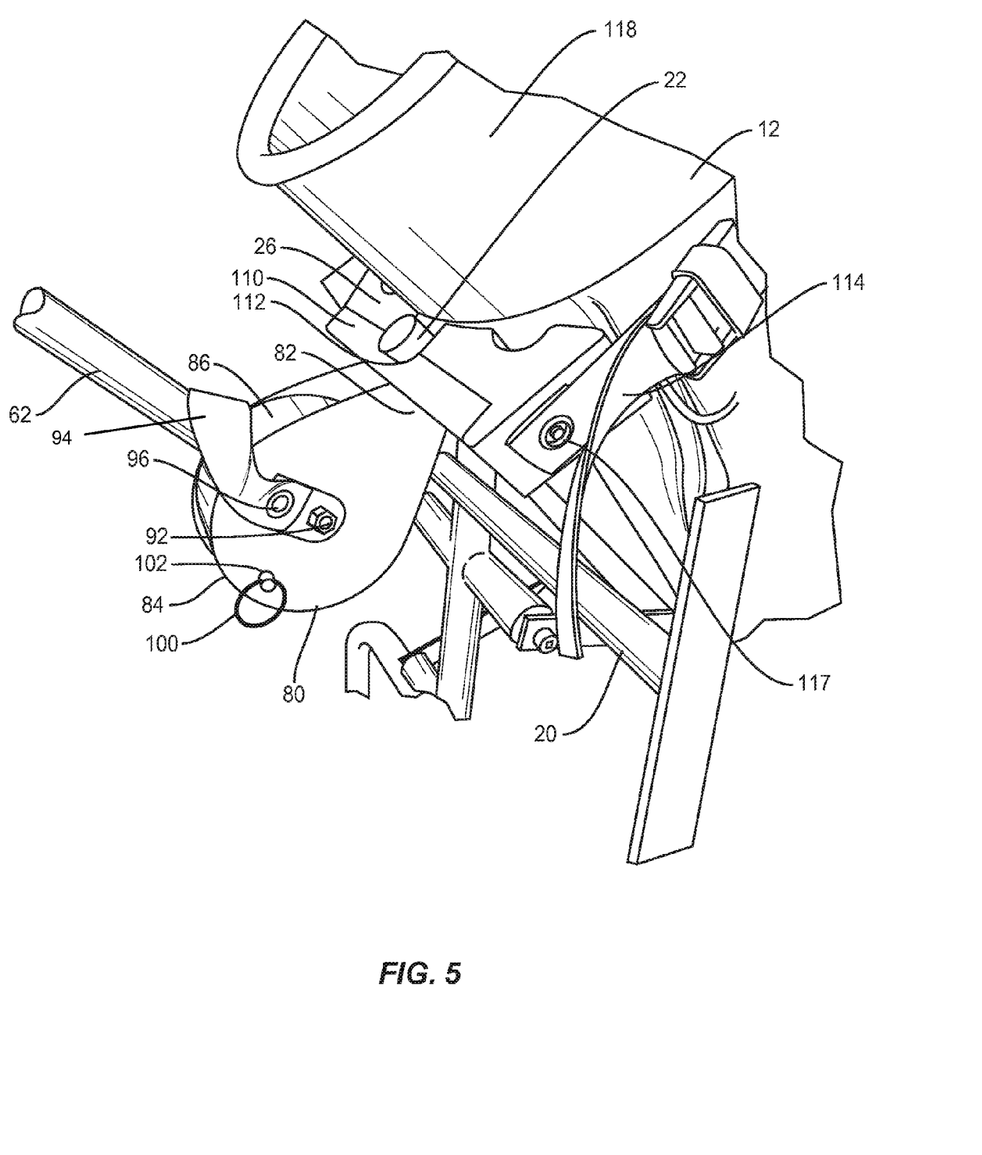
FIG. 5 is a breakaway side view of a component of the cart according to principles of the present disclosure.

FIGS. 5 and 6 illustrate the structure and function of handle support system 80. Handle support system 80 includes a core 86 sandwiched between two metal plates, a first metal plate 88 and a second metal plate 90, both metal plates attached to each other by a nut and bolt assembly 92. Core 86 can be made of wood, plastic or any other suitable material. At about 45° to horizontal axis L-L core 86 defines an opening 87 configured to receive threadingly a handle 62. Nut and bolt assembly 92 can also be used to attach a grip band 94 used to pull cart 10 when handle 62 is removed. Grip band 94 is attached to the nut and bolt assembly 92 by snaps 96.

Handle support system 80 is a cam shaped device that, in some embodiments, has a truncated oval shape having a truncated end 82 and a rounded end 84. Handle support system 80 translates the rotation motion of the handle into a forward and backward motion of the first set of wheels 40, 42.

As illustrated in FIG. 5, at the truncated end 82, handle support system 80 is hingedly attached to a top bag support mount 26 through hinged bracket 110.

As further illustrated in FIGS. 5 and 6, handle support system 80 also includes a locking ring pin 100 disposed opposite nut and bolt assembly 92, about 90° from handle 62 and in the vicinity of rounded end 84.

As also illustrated in FIGS. 5 and 6, locking ring pin 100 fits through bore 102 which perforates first metal plate 90 through core 86 and second metal plate 88 to secure handle 62 in an upward or downward position substantially parallel to hollow shaft 20 in which cart 10 is in a folded position.

Figure 7:
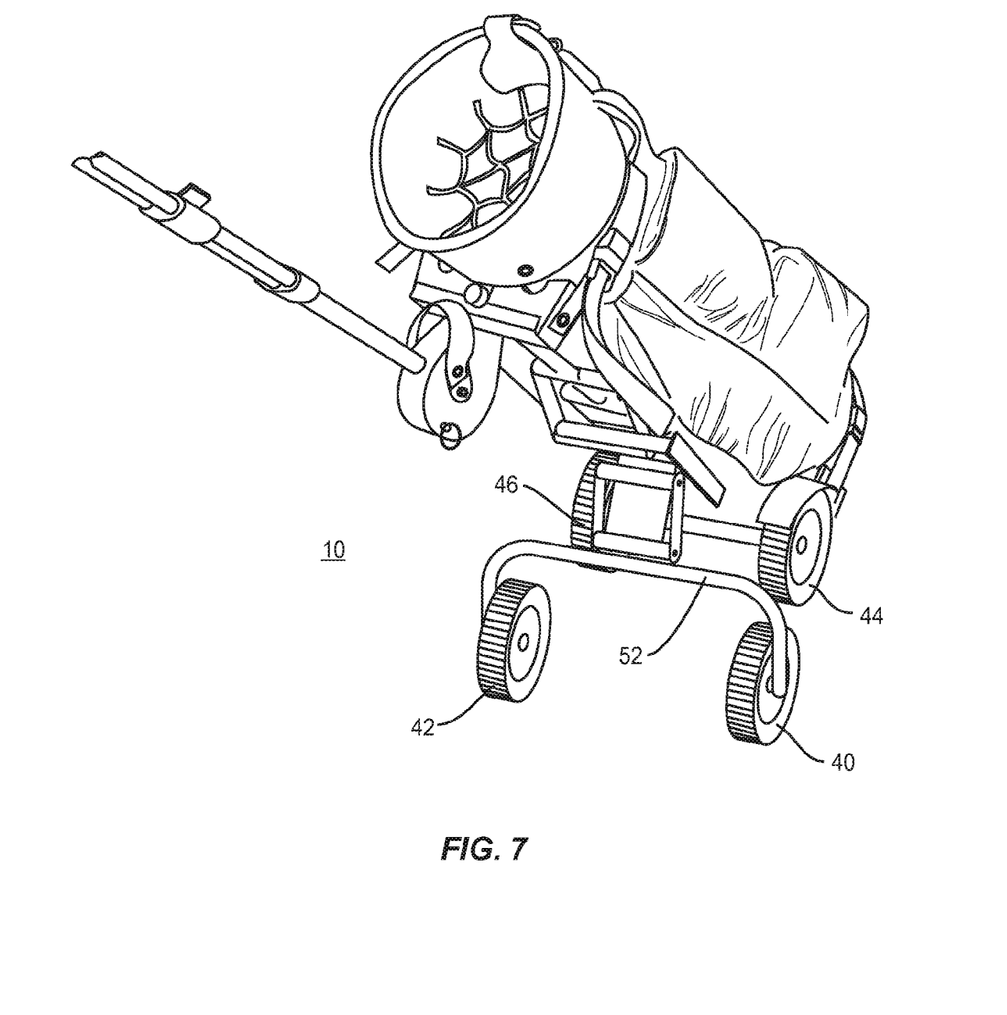
FIG. 7 is a breakaway side view of a bag/cart combination in a partially open position according to principles of the present disclosure.

In one embodiment illustrated in FIGS. 1 and 2, handle 62 can be in a downward position substantially parallel to hollow shaft 20 and the first set of wheels 40, 42 wraps around the second set of wheels 44, 46 in a folded position. In another embodiment illustrated in FIG. 8, handle 62 is moved in an upward position substantially parallel to hollow shaft 20 and the first set of wheels 40, 42 wraps around the second set of wheels 44, 46 once again in folded in a side-by-side position. FIG. 7 illustrates an intermediate or transition position of golf cart 10 between the open position illustrated in FIG. 4 and a folded or closed position illustrated in FIGS. 1 and 8.

Once locking pin 100 is removed, handle 62 can move upward with only one hand and cart 10 becomes unfolded in an open position as shown in FIG. 4 with the first set of wheels 40, 42 pushed backward, no longer side-by-side and wrapped around the second set of wheels. It is the removal of the locking ring pin that enables a golfer to fold and unfold cart 10 with only one hand.

With further reference to FIGS. 1 to 4, golf bag 12 generally includes a housing 130 defining a chamber 132 into which items to be carried, such as golf clubs, can be placed. Golf bag 12 also includes a base 16 which is secured at the bottom of housing 130 to provide support and a point of contact between golf bag 12 and the ground. A variety of materials, composite or plastic textiles and the like may form and/or be provided on the exterior of the housing 130 and/or otherwise used in the golf bag construction. In some embodiments, housing 130 of golf bag 12 comprises a flexible material, for example, high grade nylon, leather or vinyl to provide maximum protection at a minimum weight.

Housing 130 of golf bag 12 is generally an elongated, hollow tubular or cylindrical structure including a top collar 118 and a divider 136 secured at an upper end of housing 130. In an embodiment as illustrated in FIG. 2, divider 136 can have a honeycomb structure and defines a plurality of apertures 138 that provide access to chamber 132 and help keep the golf clubs separated from each other.

When in use, shafts of golf clubs extend through the apertures and along the longitudinal length of the housing 130. Heads of the golf clubs remain accessible and generally at the exterior of the golf bag 12. Divider 136 may be used to organize and prevent damage to the golf clubs. In this regard, divider 136 may be formed of a polymer or other material and/or may have a foam and/or textile sheath to provide a yielding and protective surface for contacting clubs.

Golf bag 12 also can include a semi-rigid frame that extends between divider 136 and base 16 to provide a supporting structure that retains the generally elongate and tubular configuration of housing 130. In some embodiments, the frame may have the configuration of one or more shafts that extend along the side of housing 130. Suitable materials for the frame of golf bag 12 include a variety of polymer materials, graphite, wood, fiberglass, and lightweight metals, such as aluminum. In alternate arrangements, the frame of golf bag 12 may have the configuration of multiple stay rods that extend between divider 136 and base 16. Other housing 130 and/or frame structures are possible without departing from the invention, including conventional structures and/or constructions as are known and used in the art.

As described above and also illustrated in FIG. 3, top golf bag support mount 26 also secures the top portion of golf bag 12. In certain embodiments, golf bag 12 is secured to cart 10 by a pair of flexible straps 114, 116 attached to top golf bag support mount 26 through snaps 117. Straps 114, 116 can secure golf bag 12 right below collar 118 of golf bag 12. The free ends of straps 114 and 116 can end with adjustment members 140, 142. It is contemplated that many other types of mechanisms can be used to secure the golf bag top such as, for example, a buckle, Velcro®, components, tighteners and the like.

Figure 9:
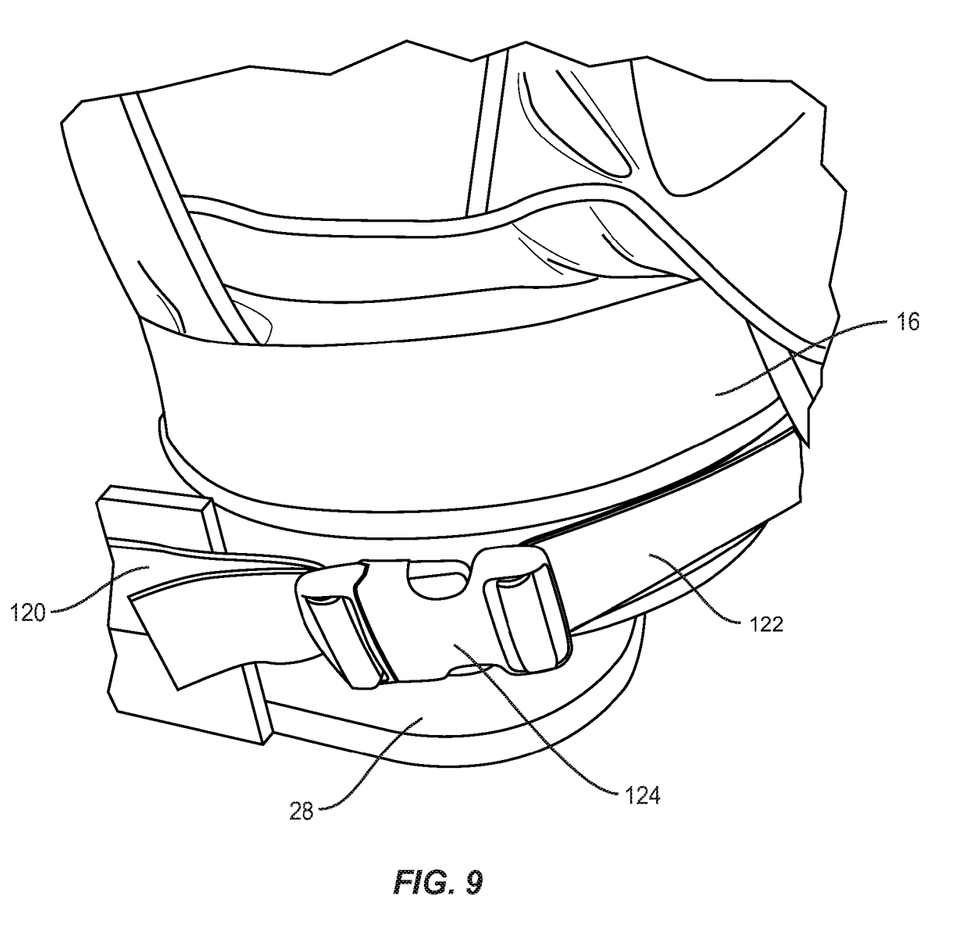
FIG. 9 is a breakaway view of the bottom portion of a component of the bag/cart combination according to principles of the present disclosure.

As discussed above, at bottom end 24, hollow shaft 20 is connected to bottom bag support element 28 by an attachment mechanism including a sky-boot type clamp or, as illustrated in FIGS. 9 and 10, two snaps secured straps 120, 122 of adjustable length and a side squeeze buckle 124. Bottom bag support element 28 can be shaped as a rounded boot or box following the outline of the bottom portion 16 of golf bag 12. In some embodiments, bottom support bag 28 can be made of wood, plastic, light aluminum sheet or another hard but light material capable of carrying the weight of golf bag 12. In some embodiments, golf bag support element 28 includes a ring 176 centrally disposed on one of its sides to facilitate securing the bottom 16 of bag 12 to the support element.

As also illustrated in FIGS. 1 and 3, golf bag 12 also includes a plurality of compartments or pockets for storage distributed around the exterior of the housing 130. The pockets 146, 148 and 150 may vary in size and generally may provide a substantially enclosed region in which garments or various golf accessories, such as golf tees, balls, towels, rain gear, range finders, and the like, as well as personal items, may be stored. The pockets 146, 148 and 150 generally are enclosed on at least on one side by a zipper, a hook and loop fastener, a snap fastener, a tie fastener, or other type of fastener or closure system to prevent objects within the pockets 146, 148 and 150 from spilling out.

With respect to FIG. 3, a fully adjustable shoulder strap 160 is provided for carrying golf bag 12. At each end, strap 160 ends with a reinforced leather piece 161a and 161b. Strap 160 has snap hook 162 attached at its upper end to releasably snap on to rings 163. Ring 163 is mounted to a flap 164 on the top of circumferential rim 134 of golf bag 12. At its lower end, leather piece 161b of strap 160 is connected to strap 180, in turn connected to golf bag 12 through a side squeeze buckle 182 disposed above pocket 148 as shown in FIG. 10. Strap 160 can be used to carry golf bag 12 on the shoulder and, in some embodiments may be lined with foam padding or any other soft material.

Golf bag 12 is also provided with various other handles for toting the bag in various positions as illustrated in FIGS. 3 and 10. As further illustrated in FIG. 10, bag 12 also includes a harness handle 170 positioned with one end below collar 118 and at the other end attached by snaps midlevel next to pocket 146 underneath shoulder strap 160. Harness handle 170 can be used for toting bag 12 with or without golf clubs. A third trunk handle 174 can be provided at the bottom of bag 12 to provide additional help in carrying the bag. In some embodiments, trunk handle 174 can be used to anchor bag 12 to bottom golf bag support element 28 through ring 176 utilizing straps 120, 122.

Figure 11:
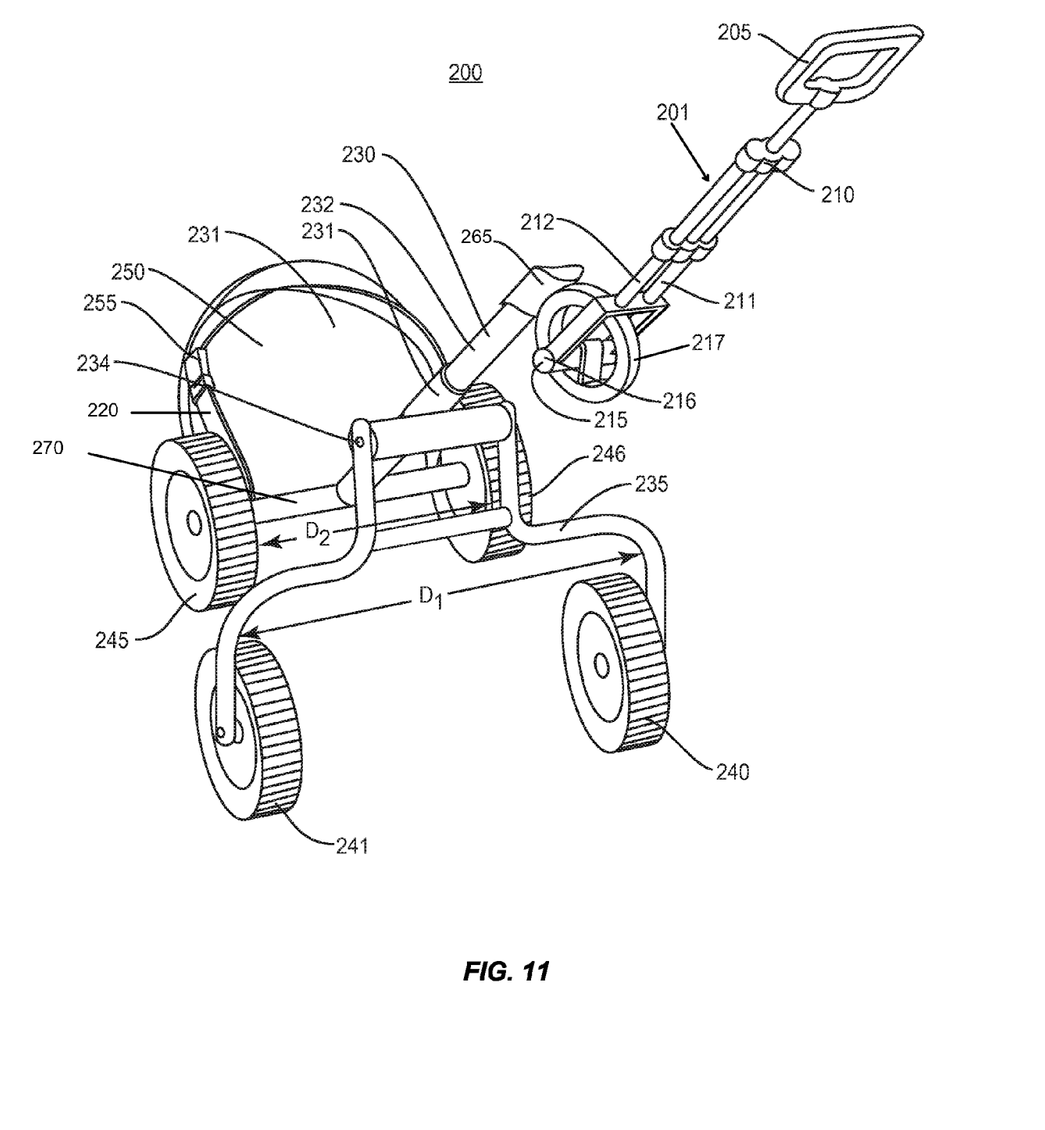
FIG. 11 is perspective side view of the bag/cart combination shown in the open position according to the principles of the present disclosure.

With respect to the embodiment in FIG. 11, the foldable golf cart 200 is shown in perspective side view in the open position. Cart 200 includes a single bar cart frame 230, a handle assembly 201, and a first set of wheels 240, 241 and a second set of wheels 245, 246. In some embodiments, as illustrated in FIG. 11, the single bar cart frame 230 includes a hollow crescent spine 232, bottom connector 231 and top connector 265. It is envisioned within the scope of the present disclosure that the single bar frame can take alternative configurations including solid or hollow, and can be tubular, circular, triangular, square, rectangular or any other polygonal shape. Bottom connector 231 connects the hollow crescent spine 232 with wheel frame 235 at pivot axle 234. In the embodiment depicted in FIG. 11 the top connector 265 connects the hollow crescent spine 232 with handle assembly 201 at pivot point 216. In one embodiment of the present disclosure pivot point 216 may be structured to form a handle bar 217 for easy maneuverability of golf cart 200 in an open or closed, collapsed position. Pivot point 216 includes pivot axel 215 about which point handle assembly 201 can rotate. The handle assembly 201 further includes a two-bar system 211, 212 connected to each end of pivot axle 215. In the alternative the handle system can be a single bar or more than two bars depending on the desired design. The handle system can be configured to swing into place about the pivot point or can be telescopic. The telescopic support system 210 extends axially from the two-bar system 211, 212 and connects to top handle bar 205.

A bottom bag support element 250 extends perpendicularly from the base of the hollow crescent spine 232. Support strap 220 is attached to the framework of the bag support and is used for securing the golf bag 260 (FIG. 12) to the bottom bag support element 250 using side squeeze buckle 255. Other types of connecting mechanisms are also envisioned to be used with the present device. In some embodiments, bottom bag support element 250 can be made of wood, plastic, light aluminum sheet or another hard but light material capable of carrying the weight of a golf bag.

As further illustrated in FIG. 11, the first set of wheels 240, 241 are connected to each other through wheel frame 235 with a distance of $D_1$ between wheel 240 and 241. In some embodiments, second set of wheels 245, 246 are connected by a straight axel 270. Axel 270 creates a distance of $D_2$ between wheels 245 and 246. Distance $D_1$ is configured to be distanced further apart than distance $D_2$ such that upon folding golf cart 200 about pivot axle 234, the first set of wheels 240, 241 wrap around and envelop the second set of wheels 245, 246. Wheel frame 235 and straight axel 270 are structured such that each first and second set of wheels remains parallel to each other at all times, in both a closed, collapsed position (FIG. 12) and an open position.

Figure 12:
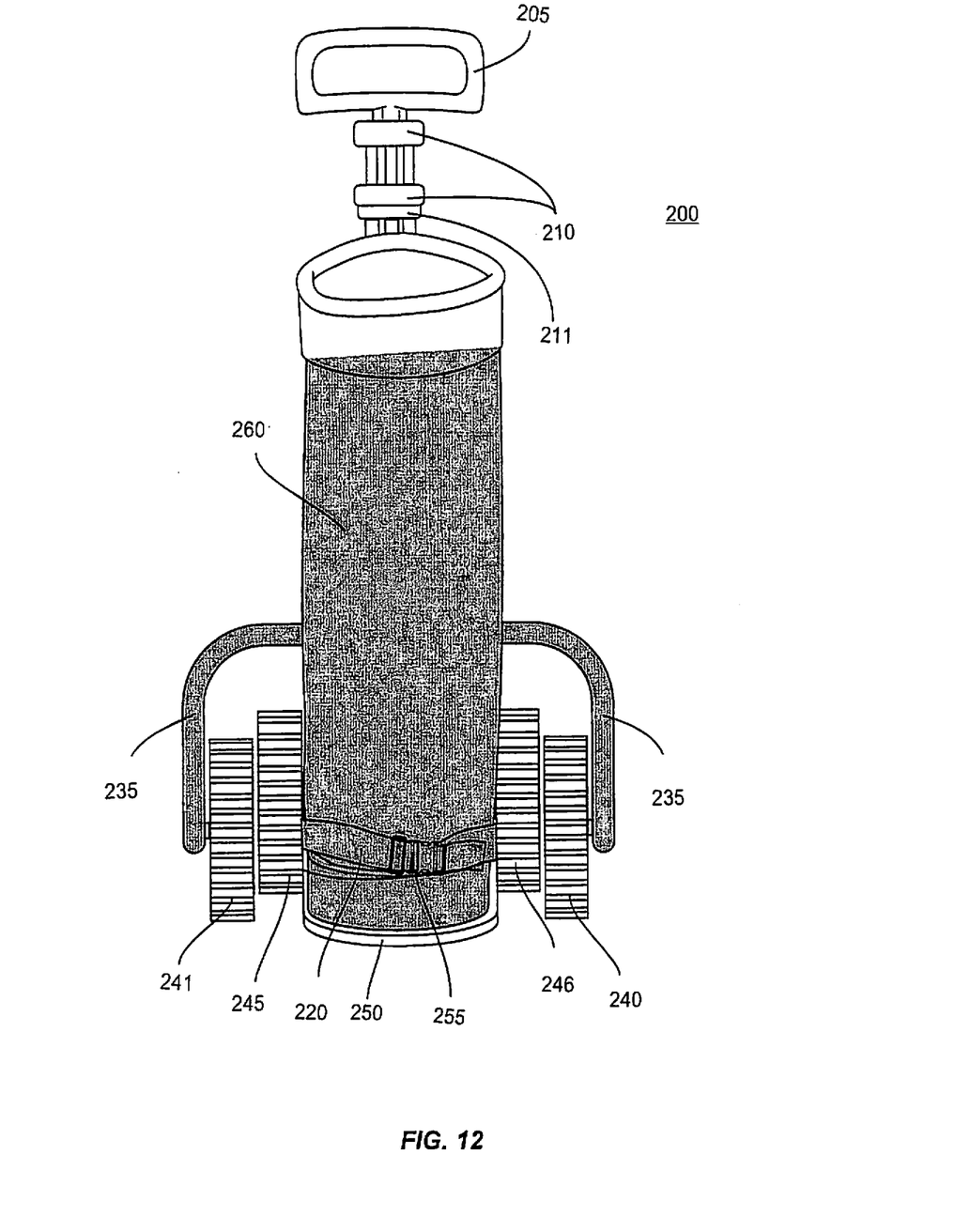
FIG. 12 is a front view of the bag/cart combination shown in a collapsed position according to the principles of the present disclosure.

With respect to FIG. 12, the foldable golf cart 200 is shown in front view in a closed, collapsed position. As shown in FIG. 11, distance $D_1$, configured to be distanced further apart from distance $D_2$, enables the first set of wheels 240, 241 to wrap around and envelop the second set of wheels 245, 246. To allow for easy storage, telescopic support system 210 collapses the handle assembly 201 to decrease the overall size of golf cart 200. Suitable materials for the frame of golf cart 200 include a variety of polymer materials, graphite, wood, fiberglass, lightweight metals, and composites.

Having fully described at least one embodiment of the present invention, other equivalent or alternative methods of providing a folding cart according to the present invention will be apparent to those skilled in the art. The invention has been described above by way of illustration, and the specific embodiments disclosed are not intended to limit the invention to the particular forms disclosed. Although the disclosure has been described with reference to some embodiments, persons skilled in the art will recognize that changes may be made in form and detail without departing from the spirit and scope of the disclosure. For example, the particular implementation of the cart may vary depending upon the particular type of application for which it is to be used. The carts described in the foregoing were directed to golfing implementations; however, similar techniques are to provide folding carts for transporting various different items such as, but not limited to other types of sports equipment, gardening tools, camping gear. Non-golfing implementations of the present invention are contemplated as within the scope of the present invention. The invention is thus to cover all modifications, equivalents, and alternatives falling within the spirit and scope of the following claims.

What is claimed is:

1. A cart for a golf bag comprising:
a cart frame for receiving and releasably retaining a golf bag;
a top golf bag support mount fixed to a first end of a shaft and a bottom golf bag support fixed to a second end of the shaft opposite the first end of the shaft;
a first pair of wheels connected to one another by a first axle having an inverted-U shape, a first end of the first axle engaging an outer surface of one of the first pair of wheels and a second end of the first axle engaging an outer surface of the other one of the first pair of wheels, the first axle being coupled to the second end of the shaft;
a second pair of wheels connected to one another by a second axle having a linear configuration, a first end of the second axle engaging an inner surface of one of the second pair of wheels and a second end of the second axle engaging an inner surface of the other one of the second pair of wheels, the second axle being coupled to the second end of the shaft and the bottom golf bag support,
wherein the first pair of wheels extend to a distance longer than the second pair of wheels, wherein upon folding, the first pair of wheels wraps around to encompass the second pair of wheels.

2. A cart according to claim 1 further comprising a handle assembly, the handle assembly comprising a handle and a handle support system, the handle support system configured to allow the handle to extend from a folded position to an unfolded position.

3. A cart according to claim 2, wherein each pair of wheels remain parallel to the other pair of wheels at all times, in both a folded position and an open position and the handle is configured to be adjustably telescopic.

4. A cart according to claim 2, wherein the cart frame further includes a linkage set linking the first axle and the second axle.

5. A cart according to claim 4, wherein the linkage set further comprises a top linkage, a bottom linkage and a plate hingedly connecting the top and bottom linkages.

6. A cart according to claim 2, wherein the handle support system comprises a first bore configured to receive a locking pin so as to lock the handle in a folded position wherein the handle is parallel to the shaft.

7. A cart according to claim 6, wherein the handle support system further comprises a second bore configured to receive the locking pin so as to lock the handle in an unfolded position.

8. A cart according to claim 7, wherein when the handle is configured to be telescopic so that the handle can be adjusted in an upward or downward position according to the height of a user.

9. A cart according to claim 1, wherein the top golf bag support mount further comprises a top golf bag retaining element configured to secure an upper portion of the golf bag to the cart.

10. A cart according to claim 9, wherein the top golf bag retaining element includes a pair of straps secured to the top golf bag support mount by snaps or an adjustable clamp system configured to removably attach the golf bag to the cart.

11. A cart according to claim 1, wherein the bottom golf bag support further comprises a bottom golf bag retaining element configured for removably securing a bottom portion of the golf bag to the cart.

12. A cart according to claim 11, wherein the bottom golf bag retaining element includes a pair of straps secured to the bottom golf bag support by snaps or an adjustable clamp system configured to removably attach the golf bag to the cart.

13. A combination golf bag and golf cart, comprising an elongate golf bag for receiving a plurality of golf clubs, the bag having a top portion and a bottom portion and a removable golf cart comprising a cart frame for receiving and releasably retaining the golf bag;
wherein the golf cart comprises:
a top golf bag support mount fixed to a first end of a shaft and a bottom golf bag support fixed to a second end of the shaft opposite the first end of the shaft, the bottom golf bag support engaging the bottom portion of the bag,
a first pair of wheels connected to one another by a first axle having an inverted-U shape, a first end of the first axle engaging an outer surface of one of the first pair of wheels and a second end of the first axle engaging an outer surface of the other one of the first pair of wheels, the first axle being coupled to the second end of the shaft,
a second pair of wheels connected to one another by a second axle having a linear configuration, a first end of the second axle engaging an inner surface of one of the second pair of wheels and a second end of the second axle engaging an inner surface of the other one of the second pair of wheels, the second axle being coupled to the second end of the shaft and the bottom golf bag support, the first pair of wheels extending a distance longer than the second pair of wheels, wherein upon folding, the first pair of wheels wraps around to encompass the second pair of wheels, and
a handle assembly, the handle assembly comprising a handle and a handle support system, the handle support system configured so as to allow the handle to extend from a folded position to an unfolded position.

14. A combination golf bag and golf cart according to claim 13, wherein the cart further comprises securing straps configured to releasably secure the golf bag to the golf cart.

15. A combination golf bag and golf cart according to claim 14, wherein the handle support system further defines a first bore positioned to perforate the handle support system from a first plate through a core to a second plate, the first bore configured to receive a locking pin to lock the handle in a desired position.

16. A combination golf bag and golf cart according to claim 15, wherein each pair of wheels remain parallel to the other pair of wheels at all times, in both a folded position and an open position.

17. A combination golf bag and golf cart according to claim 16, wherein the cart frame includes a linkage set comprising a top linkage and a bottom linkage, the linkage set linking the first axle and the second axle.

18. A combination golf bag and golf cart according to claim 17, wherein the handle support system further defines a second bore positioned to perforate the handle support system from the first plate through the core to the second plate, the second bore configured to receive the locking ring pin to control the movement of the handle.

19. A method of using a golf bag with a golf cart comprising:
providing the golf cart according to claim 18,
moving the first pair and the second pair of wheels from a retracted position wherein the wheels are positioned close to the golf cart to an open position wherein the wheels are positioned a distance further away from the cart than when the cart is in the retracted position and each pair of wheels remain parallel to each other at all times;
unfolding the handle from a folded position to an extended position by removing the locking pin from the first bore, moving the handle to the unfolded position and locking the handle in place by inserting the locking pin in the second bore; and
mounting the golf bag to the golf cart using straps so that the golf cart is attached to the golf bag and ready for use.

20. A method of using a golf bag with a golf cart according to claim 19, further comprising:
preparing the golf cart for storing by unmounting the golf bag from the golf cart by releasing the straps so that the golf bag is released from the golf cart;
folding the handle from an unfolded position to a folded position by removing the locking pin from the second bore, moving the handle to the folded position and locking the handle in place by inserting the locking pin in the first bore; and
moving the first pair and the second pair of wheels from an unretracted position to the retracted position.

* * * * *